(12) United States Patent
Viswanathan

(10) Patent No.: US 9,912,904 B1
(45) Date of Patent: Mar. 6, 2018

(54) ADAPTER DEVICE FOR TELEVISION SCREEN OR CHANNEL EXTENSION

(71) Applicants: RxPrism Health Systems Private Limited, Bangalore (IN); Maruthi Viswanathan, Bangalore (IN)

(72) Inventor: Maruthi Viswanathan, Bangalore (IN)

(73) Assignees: Maruthi Viswanathan, Bangalore (IN); RxPrism Health Systems Private Limited, Bangalore (IN)

( * ) Notice: Subject to any disclaimer, the term of this patent is extended or adjusted under 35 U.S.C. 154(b) by 0 days.

(21) Appl. No.: 15/665,381

(22) Filed: Jul. 31, 2017

(51) Int. Cl.
| | |
|---|---|
| *H04N 7/00* | (2011.01) |
| *H04N 11/00* | (2006.01) |
| *H04N 7/01* | (2006.01) |
| *H04L 29/06* | (2006.01) |
| *H04N 7/10* | (2006.01) |
| *H04N 5/44* | (2011.01) |
| *H04N 5/46* | (2006.01) |
| *H04N 5/63* | (2006.01) |
| *H04W 4/00* | (2018.01) |
| *H04W 4/06* | (2009.01) |

(52) U.S. Cl.
CPC ....... *H04N 7/0117* (2013.01); *H04L 65/4092* (2013.01); *H04N 5/4403* (2013.01); *H04N 5/46* (2013.01); *H04N 5/63* (2013.01); *H04N 7/10* (2013.01); *H04L 65/4076* (2013.01); *H04W 4/008* (2013.01); *H04W 4/06* (2013.01)

(58) Field of Classification Search
CPC ...... H04N 7/0117; H04N 5/4403; H04N 5/44; H04N 5/46; H04N 5/63; H04N 7/10; H04L 65/4092; H04L 65/4076; H04W 4/008; H04W 4/06

USPC ................. 348/730, 552, 734, 725
See application file for complete search history.

(56) References Cited

U.S. PATENT DOCUMENTS

| | | | | |
|---|---|---|---|---|
| 8,812,629 | B2 * | 8/2014 | Arling | G08C 17/02 709/220 |
| 9,258,342 | B2 * | 2/2016 | Shuster | H04L 65/4069 |
| 9,535,561 | B2 * | 1/2017 | Park | G06Q 10/00 |
| 2013/0097648 | A1 * | 4/2013 | Ye | H04N 21/4126 725/110 |
| 2015/0195620 | A1 * | 7/2015 | Buchner | H04N 21/4788 725/141 |

* cited by examiner

*Primary Examiner* — Trang U Tran
(74) *Attorney, Agent, or Firm* — AU LLC; Adam E. Urbanczyk

(57) ABSTRACT

The present invention relates to a television extender adapter device (102) that enables users to extend a television (101) screen or channel to their portable devices such as mobile phones (112), laptops (113) and tablets (114) with a multi-channel viewing option. The adapter device (102) provides a Wi-Fi network (111) for all portable device users to connect and view the television (101) screen or channels of their choice on their Wi-Fi-enabled portable devices consisting of a compatible browser using an intranet network thereby eliminating the requirement of an internet connection. Further, a user can stream the audio content alone through Bluetooth network (110) using the speakers or headphones compatible with their respective portable devices. The adapter device (102) provides the users an option to choose any channel from a list of available channels irrespective of the channel playing on the television (101).

7 Claims, 3 Drawing Sheets

ADAPTER DEVICE FOR TELEVISION SCREEN OR CHANNEL EXTENSION

PREAMBLE TO THE DESCRIPTION

The following specification particularly describes the invention and the manner in which it is to be performed:

DESCRIPTION OF THE INVENTION

Technical Field of the Invention

The present invention relates to an adapter device used for extending a television screen or channel onto multiple portable devices such as mobile phones, tablets and laptops through a Wi-Fi network. Further, the adapter device allows the users to connect wireless headsets or speakers through Bluetooth or Wi-Fi network to listen only to the audio thereby emitting the video content as per the user's requirements.

BACKGROUND OF THE INVENTION

Televisions are usually installed in public places such as hospitals, airports, bus stops, coffee shops, hotels and restaurants to ensure that people in the vicinity are entertained. But it is often the case that not all the people in the area have the same choice when it comes to entertainment. In order to streamline expenses only one or two televisions are allowed in a room of average size due to which people are compelled to watch whatever has been broadcasted.

To ensure silence in the vicinity, televisions are usually kept on mute thereby broadcasting only the video content to the audience which often creates angst among the viewers. Further, as the distance between the television and the viewers increases, the visibility reduces to a great extent due to which the intention of installing a television in the room is lost. In order to facilitate better viewing experience for the audience, multiple televisions are installed which burns a huge hole in the owner's pockets as the money spent on buying and installing multiple televisions is very high.

The patent application number EP2501146A2 discloses an apparatus for displaying live television in which the live television can be received and sent as output to a user on one or more display devices. Further, the patent document discusses a system which is configured to share data related to the television content by other users in a network having a channel selection option and also capable of providing audio content to the users. However, the major drawback of this invention is that it is a system and not a physical electronic portable device. It does not disclose any information about allowing the users to watch the television content in different screen resolutions as per the screen size of the portable device. Further, the patent document does not reveal any details about allowing users to connect the wireless headsets or speakers through Bluetooth or Wi-Fi network to listen to the audio alone thereby emitting the video of the television content. Also, the patent document does not disclose any information about viewing media content on the user's portable device without the user of internet.

The patent application number US2015195620A1 discloses a method and system for sharing content which includes detecting a secondary device that is paired to a main device. The main device is used to render publicly viewable content. Selection of a multimedia content for sharing, is detected at the secondary device. The selection causes the rendering of the multimedia content at a display screen of the secondary device. However, the major drawback of this invention is that it is a system and not a physical electronic portable device. It does not disclose any information about allowing the users to watch the television content in different screen resolutions as per the screen size of the portable device. Further, the patent document does not reveal any details about allowing users to connect the wireless headsets or speakers through Bluetooth or Wi-Fi network to listen to the audio alone thereby emitting the video of the television content. Also, the patent document does not disclose any information about viewing media content on the user's portable device without the user of internet.

The patent application number U.S. Pat. No. 9,258,342B2 discloses a method and apparatus for interactive mobile offer system using time and location for out-of-home display screens. The system disclosed in the patent document provides content to the consumers through the mobile devices based on the consumer's proximity to a display screen whose location is known to a server. The content includes one or more audio, video, images, or text. However, the major drawback of this invention is that it is a system and not a physical electronic portable device. It does not disclose any information about allowing the users to watch the television content with audio using the speaker or headphone of their portable device. Further, the patent document does not reveal any details about allowing users to connect the wireless headsets or speakers through Bluetooth/Wi-Fi network to listen to the audio alone thereby emitting the video of the television content. Also, the patent document does not disclose any information about viewing media content on the user's portable device without the user of internet.

Hence, there exists a need for a television extender adapter device that allows users to extend a television screen or channel to their mobile phones, laptops, or other portable devices with a multichannel viewing option thereby enabling a user to view a television channel according to their choice and location.

SUMMARY OF THE INVENTION

The present invention overcomes the drawbacks of the prior art by providing a television extender adapter device that enables users to extend a television screen or channel to their mobile phones, laptops, or other portable devices with a multichannel viewing option and automatically stream the television content along In accordance to one or more embodiment of the present invention, the adapter device is connected to a AV/S-Video/HDMi/DVI/VGA cable of a cable provider to extend a television screen/channel on the portable devices. Further the television television's AV Out/HDMi is connected to the adapter device to extend a television screen/channel on the portable devices.

In accordance to one or more embodiment of the present invention, the adapter device comprises of the input interface which acquires television or channel signal into the adapter through various connectors such as HDMi/AV/VGA/DVI/S-Video of the cable. The processing unit in the adapter device processes the input signals in real time and provides video and audio only output in different resolution and encoding formats to the broadcasting unit. Further, the processing unit by-passes the input signal directly to output interface as per output channel choice selection of the user.

In accordance to one or more embodiment of the present invention, the adapter device also comprises of the output interface which sends television or channel signal from the adapter to the television or monitor screen through connectors such as HDMi/AV/VGA/DVI. Further, the broadcasting unit in the adapter device establishes a Wi-Fi network or Bluetooth network for the purpose of live video or audio streaming respectively.

In accordance to one or more embodiment of the present invention, the adapter device comprises of a microcontroller and a power supply unit. The microcontroller controls all the units in the adapter device and also provides interface to users to help them configure certain settings of the adapter device. Further, the power supply unit supplies power to the entire adapter device.

In accordance to one or more embodiments of the present invention, the adapter device allows content of all television channels to be extended with multi-channel viewing option thereby enabling the user(s) to watch any channel of their choice.

In accordance to one or more embodiments of the present invention, the adapter device allows the content of all television channels to be viewed in different screen resolutions in accordance to the screen size of the device employed.

In accordance to one or more embodiments of the present invention, the adapter device allows the content of all television channels to be viewed along with audio using speakers or headphones of the respective device in use.

In accordance to one or more embodiments of the present invention, the adapter device allows users to connect wireless headsets or speakers through Bluetooth network or Wi-Fi network to listen to the audio alone thereby emitting the video of the television content.

Thus, the adapter device proposed in the present invention includes a full range of development features that set apart the existing practices of viewing television in public places. The adapter device enables users to extend a television screen or channel to their mobile phones, laptops, or other portable devices with a multichannel viewing option which eliminates the need for users to forcefully watch only one channel at a time. Also, the users can now watch the content of their choice and at their preferred location.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention overcomes the drawbacks of the prior art by providing a television extender adapter device that enables users to extend a television screen or channel to their mobile phones, laptops, or other portable devices with a multichannel viewing option. The adapter device provides a Wi-Fi network for all portable device users to connect and view the television screen or channels of their choice on their Wi-Fi-enabled portable devices consisting of a compatible browser. When a user connects his or her device to the adapter device's Wi-Fi network which functions on an intranet network, the browser in their portable device opens automatically and streams the TV content, along with a user interface to switch channels. Further, the user can also type any custom Uniform Resource Locator (URL) to access the TV content using an intranet network thereby eliminating the requirement of an internet. The provision of the adapter device to allow users to extend the television screen or channels to their portable devices facilitates the users to watch the content of their choice at the comfort of their location. Further, if the user wishes to listen only to the audio and thereby emit the video content, he or she can stream the audio through Bluetooth network using the speakers or headphones compatible with their respective portable devices. The proposed invention further involves the adapter device which provides the users an option to choose any channel from a list of available channels irrespective of the channel playing on the television. Apart from viewing television content, the adapter device also allows users to view flight status and other related information depending on their location. Further, the adapter device may also be integrated with the television as a future advancement of the present invention.

Figure 1:
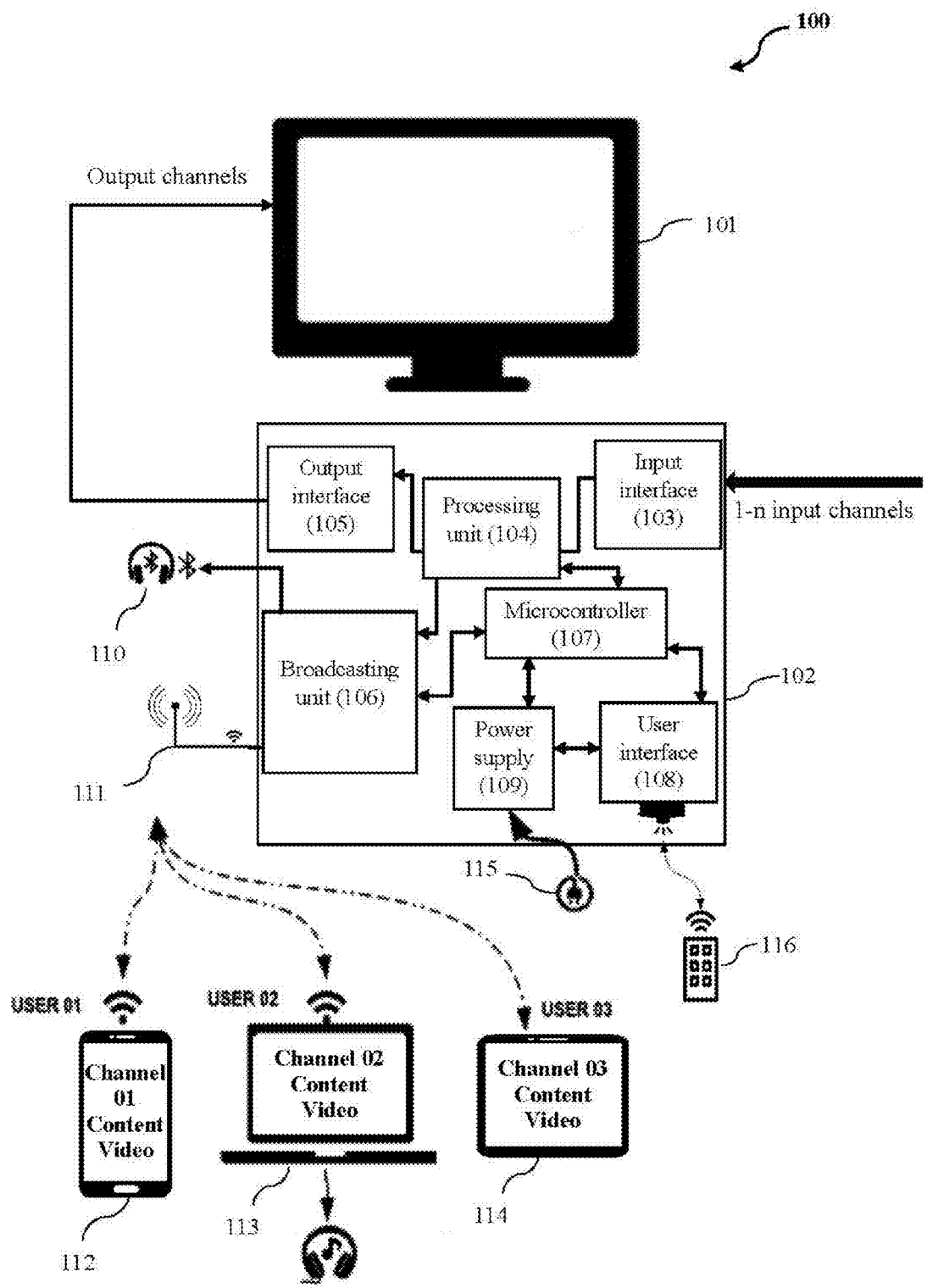
FIG. 1 illustrates a system with one of the options to connect a television with multiple portable devices routed through an adapter, in accordance to one or more embodiment of the present invention.

FIG. 1 illustrates a system with one of the options to connect a television with multiple portable devices routed through an adapter, in accordance to one or more embodiment of the present invention. The system (100) comprises of a television (101) connected to an adapter device (102) whose primary objective is to extend a television screen or channel onto multiple portable devices such as mobile phones (112), laptops (113) and tablets (114) through a Wi-Fi network (111).

In accordance to one or more embodiment of the present invention, the adapter device (102) receives its input ranging from 1 to n channels from the input interface (103) consisting of different type of connectors like HDMi/AV/VGA/DVI/S-Video to obtain channel or television signal into the adapter device (102).

In accordance to one or more embodiment of the present invention, the adapter device (102) consists of a processing unit (104) which will process the input signals from the input interface (103) in real time and provide video and audio only output in different resolutions and encoding formats to the broadcasting unit (106). Also video processing unit (104) by-pass input signal directly to output interface (105) as per user output channel choice selection. Further, the broadcasting unit (106) establishes Wi-Fi network (111) for user devices such as mobile phones (112), laptops (113) and tablets (114) to get connected and receive live video streaming content. Every channel will have a different ID or stream link. Based on the user's choice of channel, the respective stream connection will be established. The broadcasting unit (106) also establishes a Bluetooth network (110) for Bluetooth enabled user headsets or devices to get connected and receive live audio streaming content.

The microcontroller unit (107) acts as the heart of the adapter device (102) and it controls all the units in the adapter device (102). It also provides interface to users to help them configure certain settings of the adapter device (102).

In accordance to one or more embodiment of the present invention, the adapter device (102) consists of the power supply (109) whose fundamental objective is to supply power to the entire adapter device (102) with the help of an Alternate Current (AC) transformer and batteries. Further, the interface unit (108) consists of user indicators/displays, Infrared (IR) remote inputs from remote control (116) to choose channels and perform various configurations of the adapter device (102). The remote control (116) establishes connections through IR, and allows the user to perform various functions like, power ON/OFF, choose output channels and so on. An application to interact with the adapter device (102) may replace the proposed physical IR remote control (116).

Figure 2:
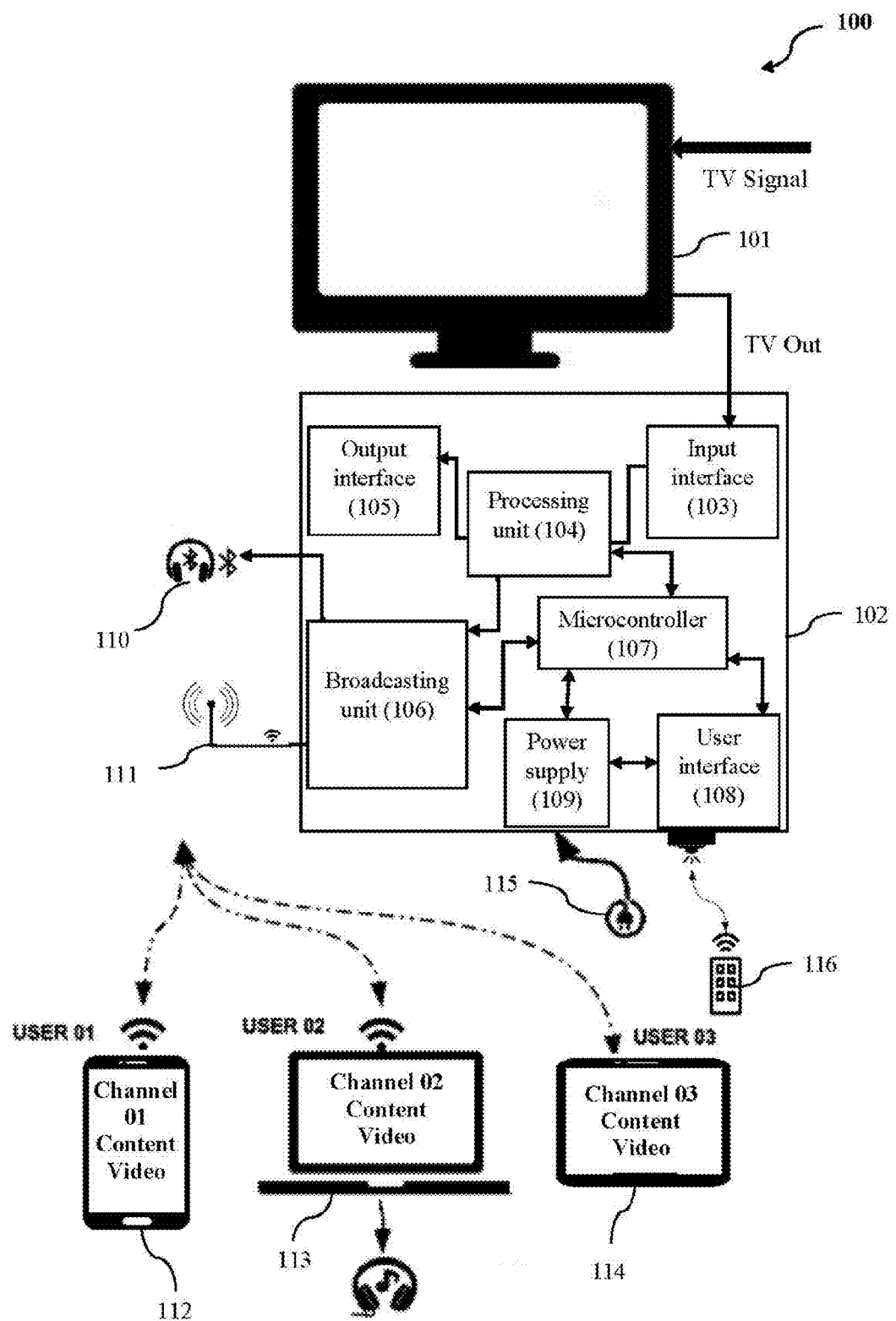
FIG. 2 illustrates a system with another option to connect a television with multiple portable devices routed through an adapter, in accordance to one or more embodiment of the present invention.

FIG. 2 illustrates a system with another option to connect a television with multiple portable devices routed through an adapter, in accordance to one or more embodiment of the present invention. This is an alternative option of connecting the television to the adapter device.

In accordance to one or more embodiment of the present invention, the system (100) comprises of a television (101) and an adapter device (102). Input in the form of HDMi/AV/VGA/DVI/S-Video is directly provided to the input ports in the television (101). The television (101) output is then connected with the input interface (103) of the adapter device (102). The adapter device (102) then processes the content in a manner explained before and broadcasts it through its Wi-Fi network (111) in case of video content or Bluetooth network (110) in case of only audio content. The portable devices such as mobile phones (112), laptops (113) and tablets (114) can now stream the content in real time.

Figure 3:
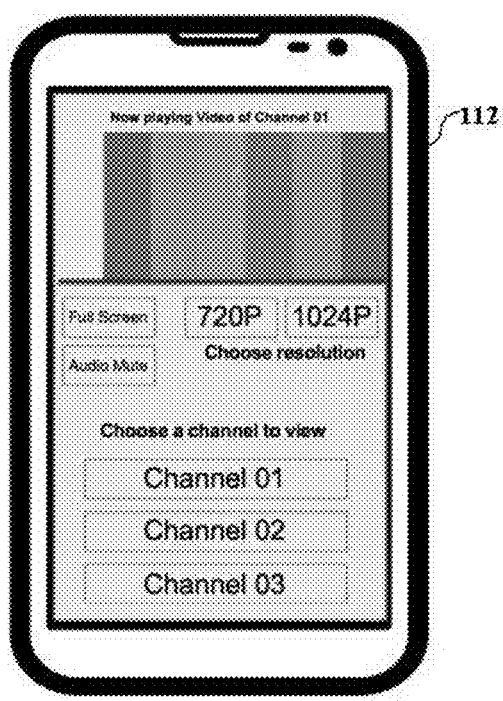
FIG. 3 illustrates a user interface that enables mobile users to view television content on their mobile devices.

FIG. 3 illustrates a user interface that enables mobile users to view television content on their mobile devices (112). This user interface allows the user to video the desired video content on their mobile devices (112). Further, the users are given an option to choose the desired channel for viewing as well as resolution of the video content. The video resolution is available in 720 pixels (P) and 1024P. The users can select the resolution favorable to them for content watching. Further during video streaming, the users are provided a choice to mute the audio if required. The users may also watch the video in full screen mode.

Figure 4:
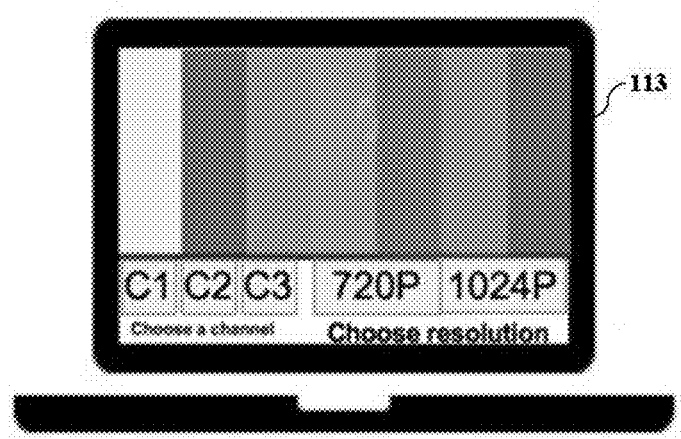
FIG. 4 illustrates a user interface that enables computer users to view television content on their laptops or desktops.

FIG. 4 illustrates a user interface that enables computer users to view television content on their laptops or desktops (113). The user interface for laptops or desktops (113) is the same interface of the mobile device (112).

Thus, the adapter device (102) proposed in the present invention allows users to extend a television screen (101) or channel to their portable devices such as mobile phones (112), laptops (113) and tablets (114) with a multichannel viewing option thereby enabling a user to view a television channel in real time according to their choice and location.

While at least one exemplary embodiment has been presented in the foregoing detailed description, it should be appreciated that a vast number of variations exist.

I claim:

1. An adapter device (102) for extending a television (101) screen or channel, wherein the adapter device (102) is configured to:

a) extend the television screen/channel on a plurality of portable devices; and,
b) automatically stream the television content along with a user interface to switch multiple channels on the portable device screen;

wherein the adapter device (102) comprises:

a) an input interface (103), wherein the input interface (103) acquires a television (101) or channel signal into the adapter device (102) through various connectors such as HDMi/AV/VGA/DVI/S-Video of a cable;
b) a processing unit (104), wherein the processing unit (104) is configured to:
process input signals in real time and provide video and audio only output in different resolutions and encoding formats to a broadcasting unit (106); and
by-pass input signal directly to an output interface (105) as per output channel choice selection of the user:
c) the output interface (105), wherein the output interface (105) is configured to send the television (101) or channel signal from the adapter device (102) to the television (101) or monitor screen through connectors such as HDMi/AV/VGA/DVI;
d) the broadcasting unit (106), wherein the broadcasting unit (106) is configured to:
establish Wi-Fi network (111) for the user device to get connected and receive live video stream in which every channel has different stream link to be established based on the user's channel choice using an intranet network; and
establish a Bluetooth network (110) for Bluetooth enabled user headsets or devices to get connected:
e) a power supply (109), wherein the power supply (109) is configured to supply power to the entire adapter device (102);
f) a microcontroller (107), wherein the microcontroller (107) is configured to:
control all the units in the adapter device (102); and
provide interface to the users to help them configure certain settings of the adapter device (102).

2. The adapter device (102) as claimed in claim 1, wherein the adapter device is connected to a AV/S-Video/HDMi/DVI/VGA cable of a cable provider to extend a television screen/channel on the portable devices.

3. The adapter device (102) as claimed in claim 1, wherein the television's AV Out/HDMi is connected to the adapter device (102) to extend a television screen/channel on the portable devices.

4. The adapter device (102) as claimed in claim 1, wherein the content of the television (101) channels is extended using the Wi-Fi network (111) or the Bluetooth network (110) of the adapter device (102) with multi-channel viewing option thereby enabling the user(s) to watch any channel of their choice.

5. The adapter device (102) as claimed in claim 1, wherein the content of the television (101) channels is viewed in different screen resolutions as screen size of the device employed.

6. The adapter device (102) as claimed in claim 1, wherein the content of the television (101) channels is viewed along with audio using speakers or headphones of the respective device in use.

7. The adapter device (102) as claimed in claim 1, wherein the user(s) are allowed to listen to the audio alone thereby emitting the video of the television (101) content using wireless headsets or speakers through Bluetooth network (110) or Wi-Fi network (111).

\* \* \* \* \*